Figure 6:
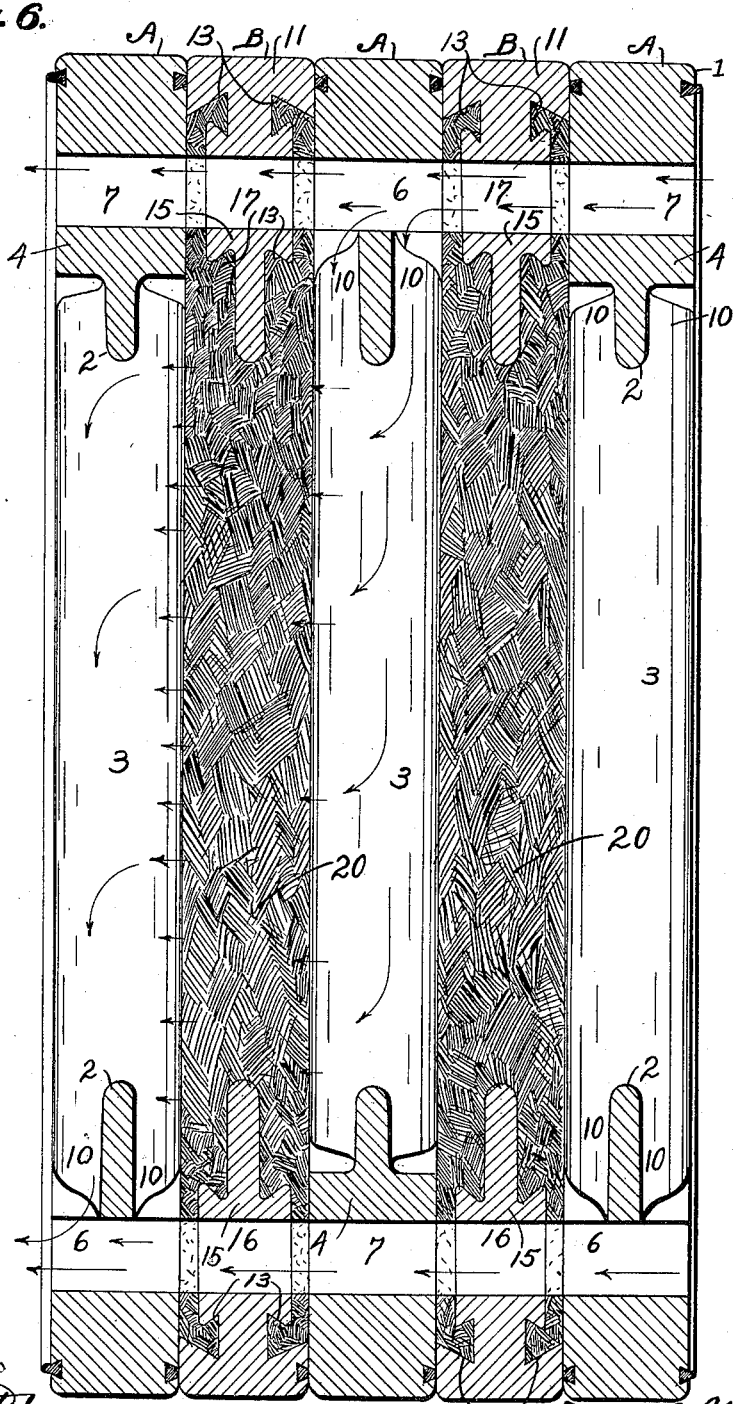

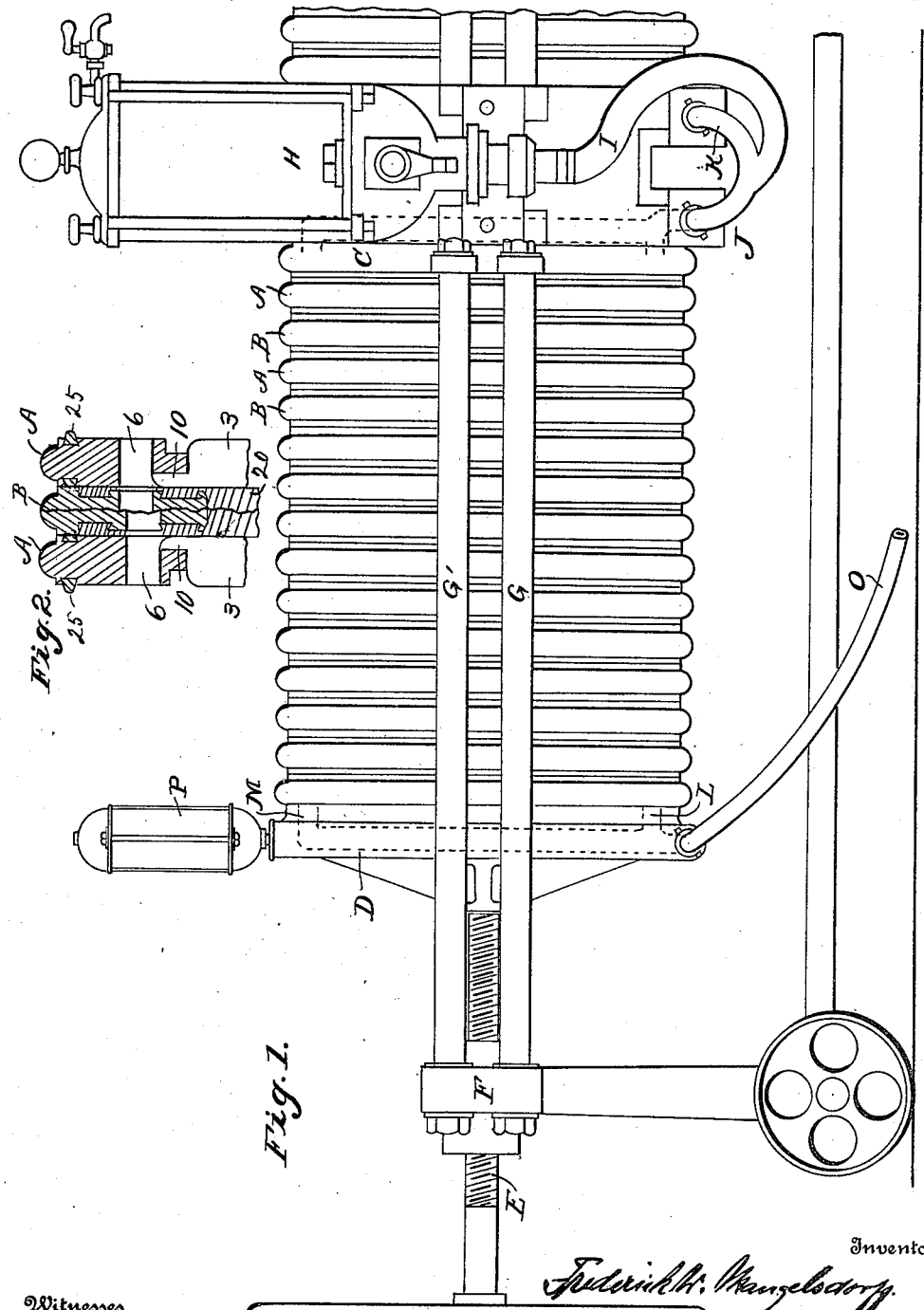

F. W. MANGELSDORFF.
FILTER.
APPLICATION FILED SEPT. 3, 1909.
1,011,130.
Patented Dec. 5, 1911.
3 SHEETS—SHEET 2.
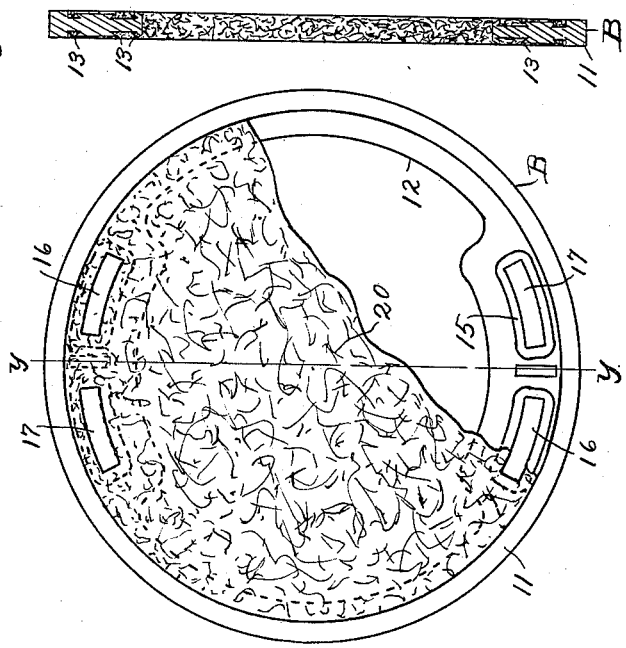
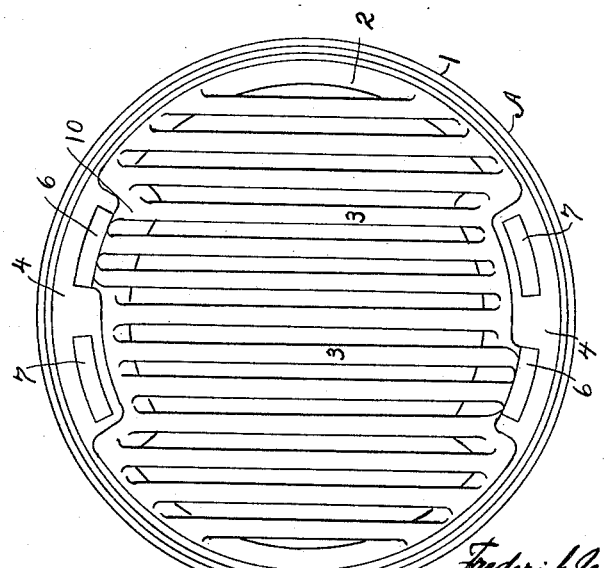
Witnesses
D. R. Frymark.
John Trusch
Inventor
Frederick W. Mangelsdorff.

F. W. MANGELSDORFF.
FILTER.
APPLICATION FILED SEPT. 3, 1909.

1,011,130.

Patented Dec. 5, 1911.

3 SHEETS—SHEET 3.

Witnesses
J. A. Otto
Edith Raasch

Inventor
Frederick. W. Mangelsdorff

UNITED STATES PATENT OFFICE.

FREDERICK W. MANGELSDORFF, OF MILWAUKEE, WISCONSIN.

FILTER.

1,011,130.  Specification of Letters Patent.  Patented Dec. 5, 1911.

Application filed September 3, 1909. Serial No. 516,019.

*To all whom it may concern:*

Be it known that I, FREDERICK W. MANGELSDORFF, a citizen of the United States, residing at Milwaukee, in the county of Milwaukee and State of Wisconsin, have invented a new and useful Filter, of which the following is a specification.

My invention relates to improvements in filters.

The object of my invention is to provide a structure composed of a series of alternating grate and filter frames, so arranged as to form inlet and outlet mains and filter beds, interposed between the ports leading from, and to, the inlet and outlet mains respectively, said grates and frames being so arranged that no outer casing is required and the several frames may be taken apart and cleansed without disturbing the filtering material which remains permanently secured in position in the respective filtering frames.

In the following description, reference is had to the accompanying drawings, in which,—

Figure 1 is a side elevation of my improved filter. Fig. 2 is a detail sectional view through two of the frames drawn partly to a plane cutting through an inlet main and partly to a plane cutting through an outlet main, the passage of liquid from the inlet to the outlet being indicated by arrows. Fig. 3 is a side view of one of the grate frames. Fig. 4 is a side view of one of the filtering frames with the filtering material partially removed. Fig. 5 is a central sectional view of the same on line $y$—$y$ of Fig. 4. Fig. 6 is a sectional view drawn through three of the grate frames and two interposing filter frames on a plane cutting through one of the inlet passages and extending parallel to the grate bars through the opposing outlet passages.

Like parts are identified by the same reference characters throughout the several views.

The body of the filter is made up of a series of grate frames A and filtering frames B arranged in alternation and clamped between a head piece C and foot piece D by a clamping screw E which has threaded bearing in a frame member F, connected with the head piece C by rods G. The liquid is admitted through a chamber H, pipe I, and ducts J and K, and exhausts through the ducts L and M and pipe O. A chamber P, having walls composed partially of glass, allows the filtered liquid to be inspected. The chamber H also has walls formed partially of glass, thus allowing an inspection of the unfiltered liquid.

Each of the grate frames comprises an annular outer ring 1 having an interiorly projecting web 2 of less thickness, the margins of which are connected by a series of parallel grate bars 3 of substantially the same thickness as the ring 1. At opposite sides of the grate frame, the ring 1 is provided with inwardly extending projections 4 of the same thickness as the ring and provided with openings 6 and 7, one of the openings serving for the unfiltered liquid, and the other opening serving for the filtered liquid as hereinafter explained. In each of the grate frames, the walls of the openings 6 are formed to provide ports 10, affording communication between such openings over the surface of the web 2 to the spaces between the grate bars.

The filter frames comprise rings 11 provided with inwardly projecting webs 12 of less thickness, and openings 16 and 17 corresponding in relative position to the openings 6 and 7 in the grate frames, the walls 15 of said openings being, however, of greater thickness than the webs, but of less thickness than the rings 11. The outer margins of the walls 15 and the inner margins of the rings 11 are undercut as illustrated at 13 in Fig. 6, and thereby retain a sheet 20 of filtering material, which is pressed into the open central space formed by the frame and covers the web and the walls 15 as shown in said figure, thus forming a filtering member which is of the same thickness as its outer margin throughout.

The grate frames and filter frames are preferably circular in form and are assembled by arranging them in alternation, and also by reversing each intermediate grate frame, whereby the rear face of one corresponds with the front face of the next, etc., and the opening 6 of one is thus alined with an opening 16 of a filter frame and an opening 7 of the next succeeding grate frame, whereby the openings 6 and 7 of successive grate frames, taken with the openings 16 of the respectively interposed filter frames, constitute a continuous inlet passage extending from one end of the structure to the other. The openings 7 and 6, respectively, of successive grate frames, register with successive openings 17 in the filter frames and constitute a complete outlet passage extending from one end of the structure to the other parallel to the inlet passage. One passage of each kind is located on each side of the structure. The ducts J and K connect with the inlet passages and the ducts L and M connect with the outlet passages. The filtering material in the frames B forms a packing upon the walls 15 between such walls and the walls of the projections 4, since it is compressed in the spaces between the members 4 and the walls 15. The path of the fluid is therefore from ducts J and K through the openings 6 of each alternate grate frame, the openings 16 of each filter frame and the openings 7 of each intermediate grate frame, and from these passages through the ports 10 to the spaces between the grate bars of the alternate grate frames and through the filtering material 20 to the spaces between the bars of the intermediate frames from which spaces it is delivered through the ports 10 of these frames into the exhaust or outlet passages.

It will be understood that the intermediate grate frames are preferably exactly like the alternate grate frames except as to position. They are reversed in position as above explained, so that their ports 10 will lead to the outlet passage. Each of the filtering frames therefore receives a portion of the liquid, and filters it independently of the others, and by increasing the number of frames the capacity of the filter will be increased to any extent within the capacity of the openings 6 and 7, 16 and 17. The rings 1 of the grate frames are provided with flexible annular packing strips 25 which bear upon the rings 11 when the frames are assembled, thus enabling me to dispense with an inclosing casing except as furnished by the rings.

In the above described structure there are no holes in the several frame members which can become clogged, the passages being formed along the surface of the web 2 between the grate bars and extending from each of the openings 6 to the inner margin of the web 2. The wall of the passage opposing the web 2 is provided in each case by that part of the filtering material which covers the webs 12 of the filter frames. When it is desired to clean the device, it is, therefore, merely necessary to separate the grate frames from the filter frames, whereupon all of these passages will be merely open sided channels or recesses which may be readily inspected and cleansed.

Having thus described my invention, what I claim as new and desire to secure by Letters Patent is,—

1. In a device of the described class, the combination with a set of filtering frames, each having an inwardly projecting web, and a margin of greater thickness than the web, and each such frame having apertured web portions of an intermediate thickness, a sheet of filtering material inclosed by said frames and covering the web portions thereof, except where apertured, and a series of grate frames interposed between the filter frames, and provided with grate bars supporting said sheets of filtering material, said grate frames being provided with apertures adapted to register with the apertures in the filter frames, and having open sided channels between the grate bars leading to certain of said apertures.

2. In a device of the described class, the combination with an open frame, having an inwardly projecting web of less thickness than the outer margin of the frame, and a sheet of filtering material filling the frame opening, substantially to said thickened outer margin, and having said web embedded in the margin of said sheet, together with a set of grate frames embracing the filtering frame, with the grate bars bearing upon and supporting the sides of the filtering sheet, said grate frames and filter frames being provided with connecting ducts near their margins extending through the marginal portions of the sheets of filtering material, for the admission and discharge of fluid;—each of the grate frames being provided with open sided channels leading from the spaces between the grate bars to one set of ducts, and said filtering frame having its web thickened adjacent to the ducts and covered with filtering material compressed by the grate frames and forming a packing surrounding said ducts, substantially as described.

In testimony whereof I affix my signature in the presence of two witnesses.

FREDERICK W. MANGELSDORFF.

Witnesses:
D. R. FRYMARK,
JOHN TOUSCH.

---

Copies of this patent may be obtained for five cents each, by addressing the "Commissioner of Patents, Washington, D. C."